Jan. 31, 1967  TERUO HIROSE  3,301,032

PLANETARY ROLLING MILL WITH STATIONARY SINGLE SHAFT

Filed March 2, 1964

INVENTOR.
Teruo Hirose
BY Stevens, Davis, Miller & Mosher
Attorneys

United States Patent Office 3,301,032
Patented Jan. 31, 1967

3,301,032
PLANETARY ROLLING MILL WITH STATIONARY SINGLE SHAFT
Teruo Hirose, Midori-ku, Nagoya-shi, Japan, assignor to Daido Seiko Kabushiki Kaisha, Ninami-ku, Nagoya-shi, Japan, and Ishikawajima-Harima Jukogyo Kabushiki Kaisha, Tokyo, Japan, both corporations of Japan
Filed Mar. 2, 1964, Ser. No. 348,375
Claims priority, application Japan, Mar. 8, 1963, 38/12,063
3 Claims. (Cl. 72—197)

Heretofore, corrugated patterns, although there are some differences peculiar to the planetary rolling, have taken place on the rolled surface of metallic plate or belt subjected to a planetary rolling. In the majority of planetary rolling mills heretofore in use the virtual outside diameter of revolution of the work roll travels in a circle. Consequently, it has been inevitable that small corrugated patterns having a concave-convex surface of 0.003–0.5 mm., peculiar to the planetary rolling and perpendicular to the direction of rolling, normally take place on the rolled surface although it depends on the number of revolutions of the work roll per unit hour because, whenever the work roll passes through the portion of the material to be rolled, the material makes a forward motion over a few millimeters. Also, for a specific rolling mill, there is one such a type as provides a group of work rolls in pairs on upper and lower stationary shafts. However, even if it is possible to theoretically design the mechanism so as to limit the length of parallel travelling of both upper and lower work rolls to a few millimeters, but it is impossible to design it so as to move both upper and lower work rolls, having a small diameter respectively, ordinarily in perfect alignment on the vertical surface. This is because the distance between the upper and lower shafts varies according to the adjustment of thickness of the plate or belt to be rolled. When using only a pair of gears, the upper and lower shafts engage precisely with each other so that they do not make a synchronous rotation. Also, the fixation of the sationary shaft will be most difficult when side rings are intended to be connected sidewise by means of a neck pinion, gear coupling, and a rod and gear coupling. Therefore, the side rings are driven respectively by the upper and lower pinions through gears. As the pinion shafts also vary in central distance, one of the bevel gears must be vertically movable by connecting the side rings by a neck pinion, gear coupling, rod and gear coupling, or by converting the rotation of the pinion shafts into a vertical rotation by means of the bevel gears on both the upper and lower pinion shafts and making the vertical shaft a spline shaft. Furthermore, the rolling mill must be designed as small as possible for use in a limited space. The inventive rolling mill is subject to such limitations. Taking in consideration the backlash of gears (back side clearance), elastic deformation and abrasion of the spline, pinion, shaft and clearances which occur when the work rolls and metal boxes make slidings, and elastic deformation of the work rolls curving toward the direction of revolution tangent, it is difficult to secure a shear of less than 0.5 mm. from the vertical surface of both upper and lower work rolls on the portion of the material subjected to a rolling process in the upper and lower roll systems. The shear of 0.5 mm produces an error of approximately 0.08 mm. in plate thickness, if the diameter of the work rolls is set at 30 mm. Therefore, corrugated patterns peculiar to the planetary rolling take place on the surface of the metallic plate or belt rolled by the planetary mill having both upper and lower shafts.

Embodiments of this invention will be explained hereinafter by referring to the accompanying drawings:

FIGURE 1 is a sectional view taken along line II—II of FIGURE 1;

Figure 3:
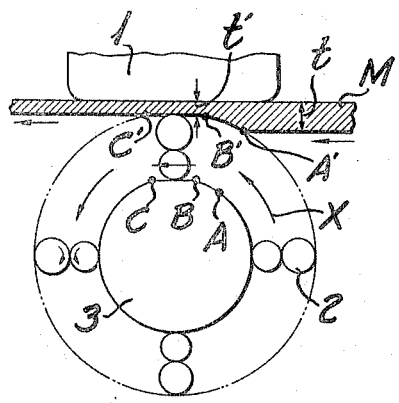
FIGURE 3 is a view showing a mode of rolling a metallic plate or belt in the case of using a stationary plate.

This invention is aimed at preventing corrugated patterns from being produced on the surface rolled. Its principle is, as shown in FIG. 3, described to the following. When the portion of the stationary shafts 3 between the points B and C is allowed to correspond to, for example to run in parallel to, the lower surface of the stationary plate 1 and the work roll 2 passes between the points B' and C' in parallel with the lower surface of the stationary plate, no corrugated patterns peculiar to the planetary rolling form on the rolled plate or belt.

Figure 1:
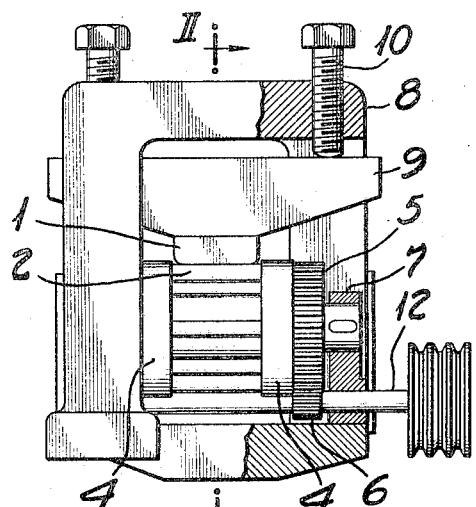
FIGURE 1 is a front view, partly in longitudinal section, showing a planetary rolling mill with a stationary single shaft constructed in accordance with this invention.

Referring to FIG. 1 rotary power of a pinion 6 of a drive shaft 12 is transmitted to a large gear 5 secured to one of the side rings 4, and supported by a stationary shaft 3.

Figure 2:
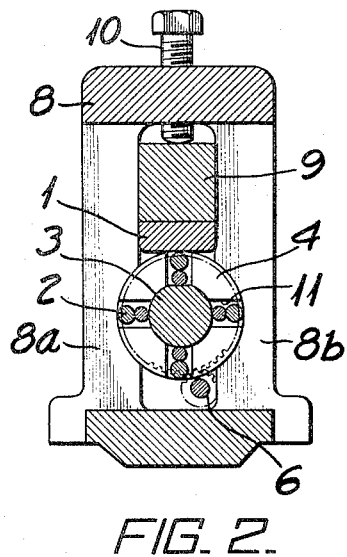

However, in the pair of side rings 4, as shown in FIG. 2, there are fitted a plurality of metal boxes 11 interposing a plurality of work rolls 2 divided equally into an optional number. Accordingly, as shown in FIG. 3, when the work rolls 2 revolve about the periphery of the stationary shaft 3 in the direction of the arrow X and reach the point A, the material M receives compression stress between the lower surface of the stationary plate 1 and the work roll 2 while the outside work roll 2 comes into contact with the surface of the material M rolled, moves from the points A to B, reduces its thickness from $t$ to $t'$ and increases its length. However, while the work rolls 2 travel from the points B to C, they travel or move rectilinearly in a horizontal direction, although the side rings make a circular movement since the lower surface of the stationary plate 1 and the portion between the points B and C (non-cylindrical face) run almost parallel to each other. The rectilinearly travelling distance (distance between B and C) increases with the increase of the distance from the axis of the stationary shaft 3. Therefore, it results in expanding the distance between the points B' and C' on the rolled surface of the material M. In the next place, when the work roll 2 passes through the point C, it continues a circular motion along the periphery of the stationary shaft 3. In such case, the work rolls are so arranged that the material makes a very slight forward movement and a plastic processing is carried out in the material by the subsequent work rolls 2 in a similar manner as the foregoing so that no corrugated patterns appear on the surface of the products after rolling.

Figure 4:
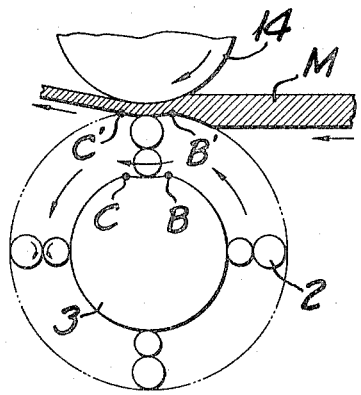
FIGURE 4 is a view showing a mode of rolling said plate or belt by the use of a slowly rotating roll having a large diameter in place of the stationary plate.

FIG. 4 shows another embodiment of this invention in the case of using a slowly rotating roll having a large diameter 14 in place of the stationary plate 1 shown in FIGS. 1 to 3 so as to prevent overheating, sizure and abrasion of the stationary plate during hot rolling. The portion of the stationary shaft 3 between the points B and carried out in the material by the subsequent work rolls revolution of the work roll between the points B' and C' moves on the concentric circle with the roll having a large diameter 14. Therefore, in this case it is possible to obtain a smooth splate in a like manner as the rolling by the use of the stationary plate 1.

Heretofore, corrugated patterns have been observed clearly on the surface of the rolled plate when a pair of work rolls of the planetary rolling mill, having a revolution diameter of 200 mm., passes through the portion of the rolled plate and approximately 1 mm. of the plate is drawn out. If the distance between the points B and C on the stationary shaft is set at 5 mm., even if approximately 4 mm. of the plate is drawn out when a pair of work rolls passes through the rolled portion of the plate, a smooth plate or belt may be obtained. Consequently, the planetary rolling mill constructed in accordance with this invention has such a great advantage that even if the rolling velocity is increased four times, no corrugated patterns are observed on the surface of the rolled plate by the use of the rolling mill of this invention. Also, in the rolling mill of this invention when the rolling process is carried out at the same rolling velocity, even if the revolution velocity of the work roll is reduced to one fourth to rotate the work roll quietly and slowly, a smooth plate or belt having no corrugated pattern may be obtained, and furthermore, the rolling mill of this invention has such an advantage that high sound of rolling peculiar to the planetary rolling is perfectly removed.

Furthermore, the stationary shaft 3 is supported on a pedestal 7 arranged between columns 8a and 8b of a roll stand 8 and backpressure of the stationary plate 1 or the roll having a large diameter 14 during the rolling is slidable in the vertical direction by a screw 10 for use in adjusting the thickness of the plate or belt interposed between columns 8a and 8b. As shown in the foregoing, the rolling mill according to this invention has a relatively simple structure. Therefore, this invention can provide a rolling mill at relatively low costs.

What I claim is:

1. A planetary rolling mill comprising a stationary shaft, a pair of side rings rotatably mounted one on either end of said shaft, a plurality of box-like recesses in each said ring, a plurality of work rolls mounted in pairs in said recesses parallel to said stationary shaft so as to make a free revolution thereabout in a planetary motion, means to drive said side rings about said stationary shaft, a member mounted parallel to said stationary roller and adjustably spaced therefrom, the adjacent surfaces of said stationary shaft and said member having correspondingly profiled surfaces so that the material passed therebetween is given a flat smooth surface.

2. A planetary rolling mill according to claim 1 wherein said member comprises a stationary plate.

3. A planetary rolling mill according to claim 1 wherein said member comprises a slowly rotating roll of large diameter, said stationary shaft having a concave surface on the side adjacent said rotating roll.

References Cited by the Examiner

UNITED STATES PATENTS

| 455,598 | 7/1891 | Malin | 80—11.2 |
| 1,622,744 | 3/1927 | Stiefel | 80—11.2 |
| 2,069,496 | 2/1937 | Kessler | 72—197 |

FOREIGN PATENTS

| 747,636 | 4/1956 | Great Britain. |
| 250,123 | 6/1948 | Switzerland. |
| 292,148 | 10/1953 | Switzerland. |

CHARLES W. LANHAM, *Primary Examiner.*

H. D. HOINKES, *Assistant Examiner.*